Nov. 21, 1950 J. E. McELREATH 2,530,893
INSECT EXTERMINATING DEVICE
Filed Oct. 28, 1944 5 Sheets-Sheet 1
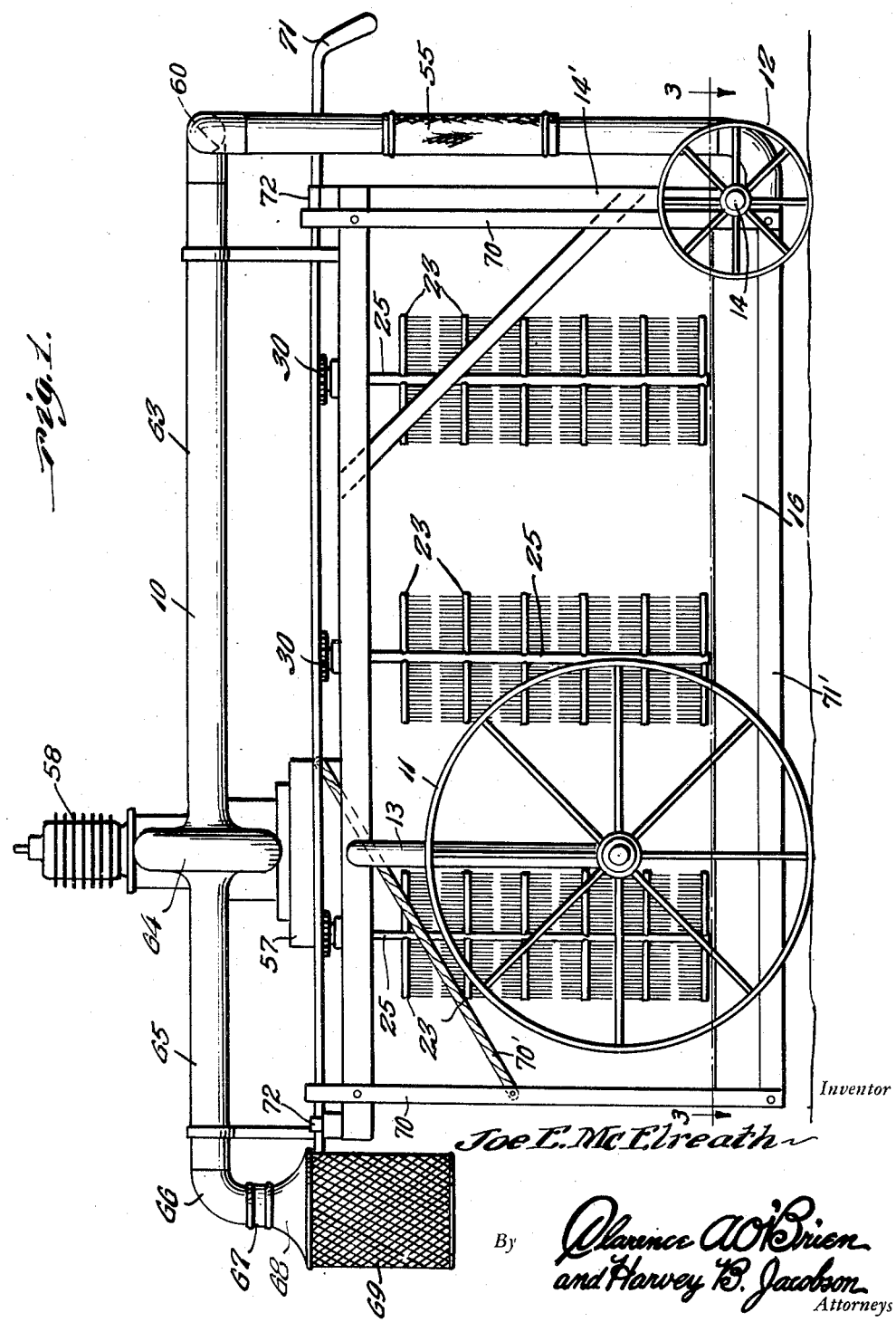

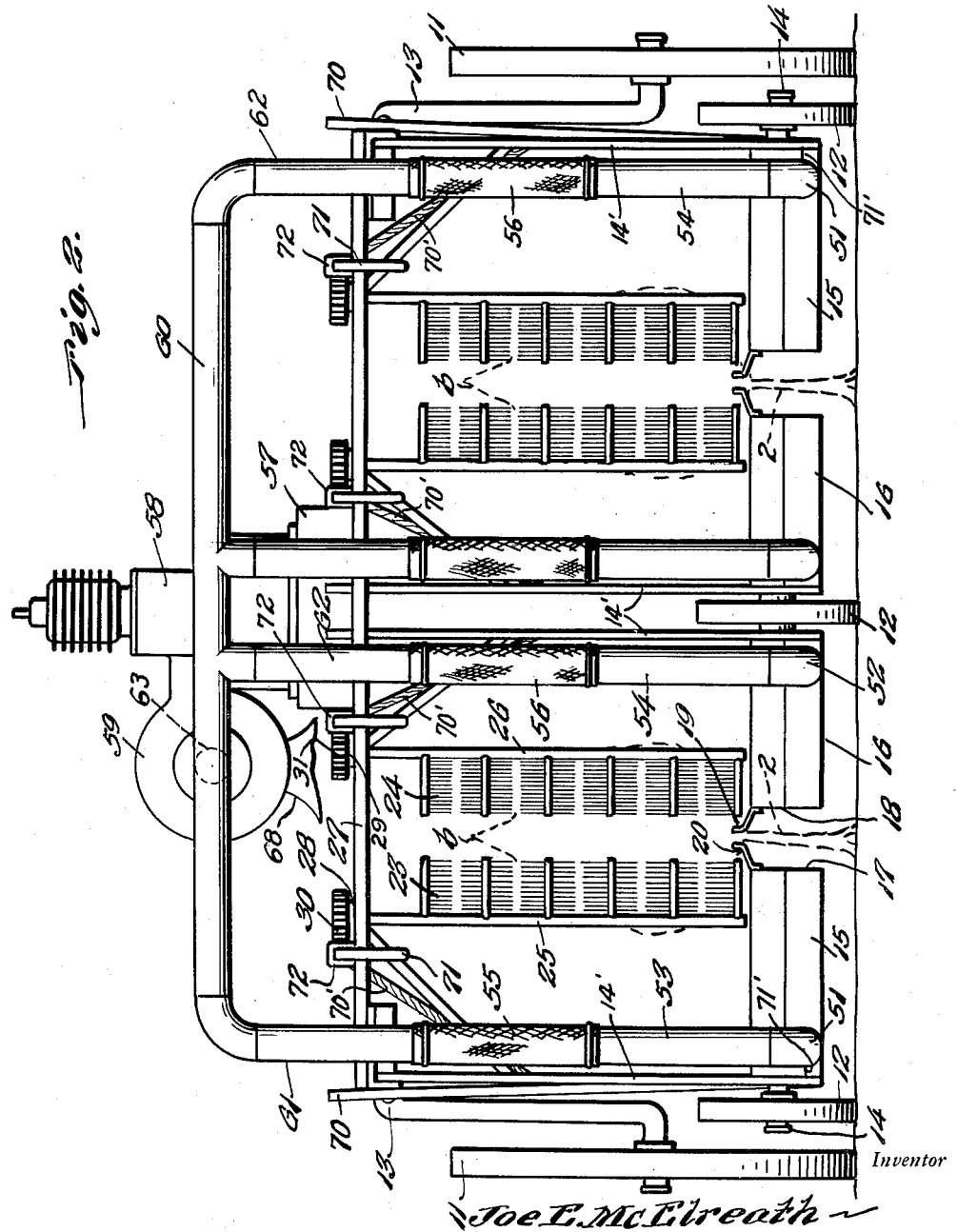

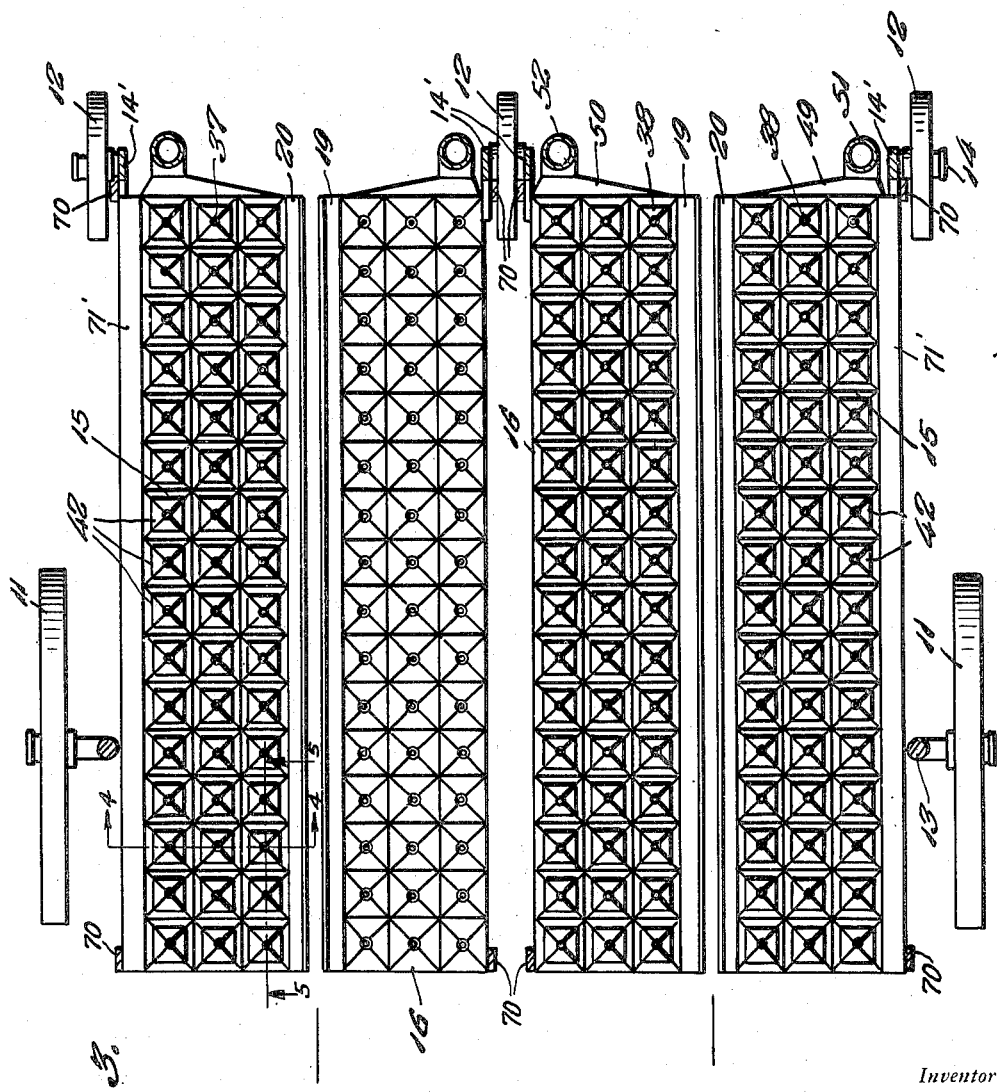

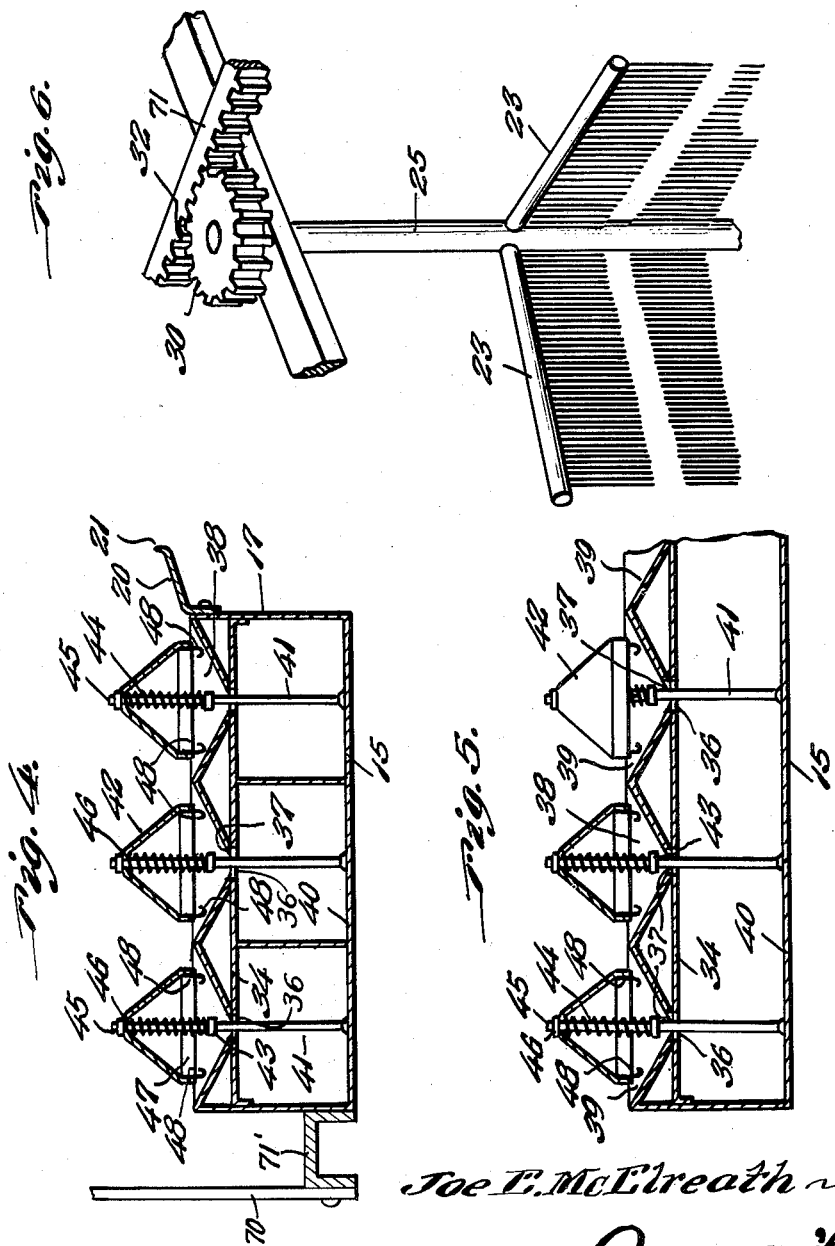

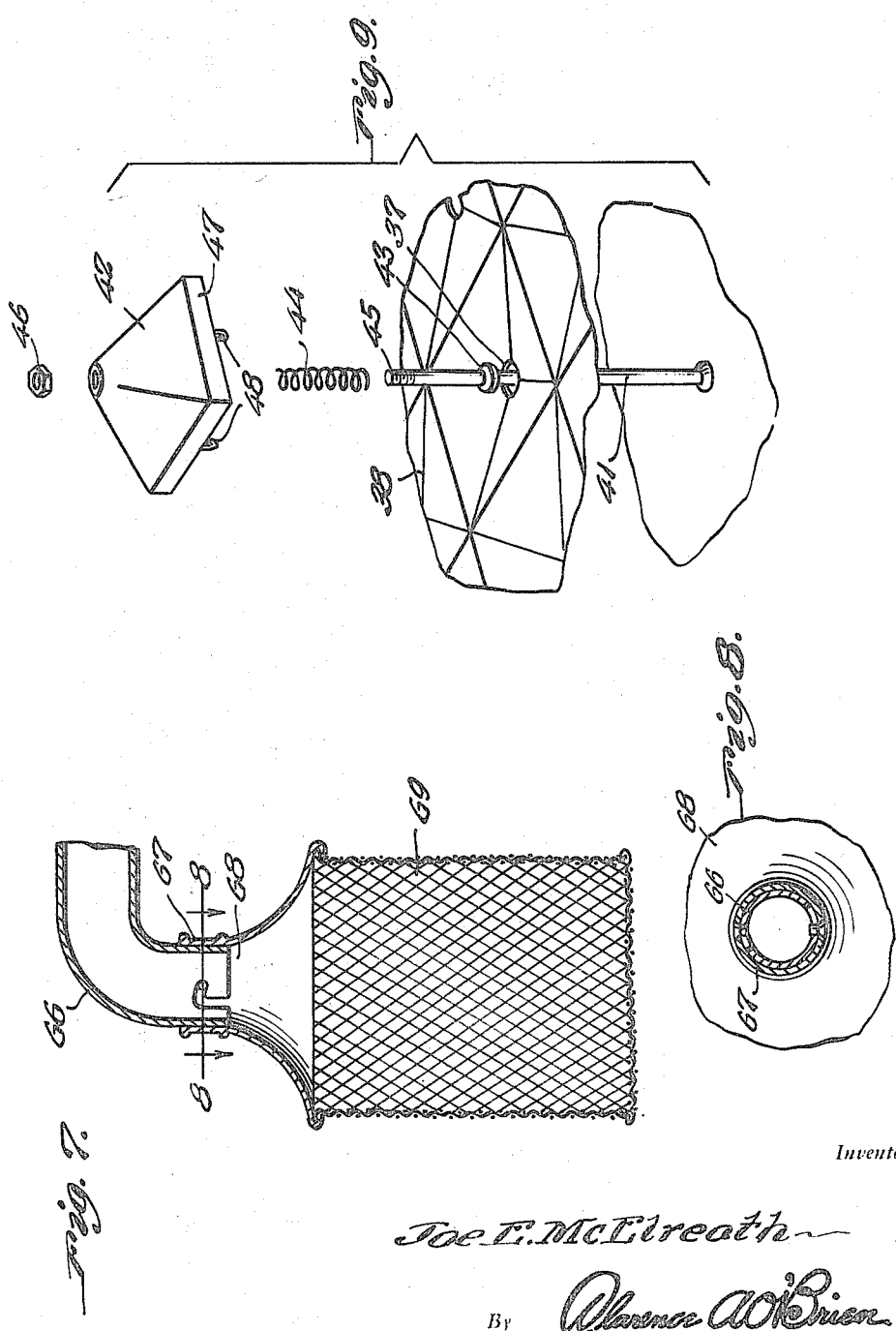

Patented Nov. 21, 1950

2,530,893

UNITED STATES PATENT OFFICE 2,530,893

INSECT EXTERMINATING DEVICE

Joe E. McElreath, Ada, Okla.

Application October 28, 1944, Serial No. 560,838

5 Claims. (Cl. 43—143)

This invention relates to agricultural implements and has for its object to provide a machine through means of which the cotton boll weevil may be collected and destroyed.

Another object of the invention is to provide a machine which will brush the boll weevils into a pan and then through a so-called vacuum device suck and deliver the weevils into an incinerator cage or other suitable container after which they can be killed.

Another object of the invention is to provide weevil collecting pans arranged to be run on each side of a row of cotton plants, and means for brushing the weevils into the pans and suction means for drawing the collected weevils from the pans and delivering them into a cage or other suitable collecting receptacle in which they may be killed and disposed of.

Another object of the invention is to provide in a boll weevil exterminating machine a series of oscillating brushes between which the cotton plant passes whereby the foliage of the plant is brushed a number of times, the brushes moving alternately forward and then back in order to thoroughly brush the foliage from all sides over and over again and in one passage of the machine along the plant rows and thus thoroughly clean the plants of the insects which are brushed into pans and then collected, through a suction system, into a cage or the like.

Cotton growers have suffered great damage and sustained losses far beyond estimating from the boll weevil pest and efforts have been made for many years to abate this nuisance but the great difficulty has been to procure means for thoroughly cleaning the plants of the insect.

Other features and advantages will become more readily apparent from the following description and the accompanying illustrative drawings.

In the accompanying drawings:

Figure 1 is a side elevational view of my machine.

Figure 2 is a rear end view thereof.

Figure 3 is a horizontal sectional view showing the collecting pans one of which has the caps removed, and taken on the line 3—3 of Figure 1.

Figure 4 is an enlarged transverse sectional view of a collecting pan taken substantially on the line 4—4 of Figure 3.

Figure 5 is a broken off longitudinal sectional view of a part of the pans and taken approximately on the line 5—5 of Figure 3.

Figure 6 is an enlarged perspective detail of a brush operating means.

Figure 7 is an enlarged detail sectional view of a collecting cage and connection.

Figure 8 is a sectional view taken on the line 8—8 of Figure 7; and

Figure 9 is an enlarged perspective detail of a cap assemblage and adjustment.

In the drawings and following specification the same reference characters indicate like parts throughout, and in which 10 indicates my machine as a whole and which may be either power propelled or horse drawn, and in which 11 and 12 indicate the wheels for supporting the device, said wheels 11 operating on a U-axle 13 and the wheels 12 on stub axles 14 which are carried by vertical supports 14' depending from a frame member 27.

Carried near the bottom of the device are spaced apart pans 15 and 16, to the inner side walls 17 and 18 of which are fixed upwardly inclined longitudinal plates 19 and 20 for directing falling insects into said pans. The links 70 which are pivoted at their lower ends to horizontal spacers 71' on the pans or directly to the pans, are secured to the frame member 27 at their upper ends to support the pans under the frame 27. The vertical rims 21 of said plates are spaced apart just sufficiently to permit free passage of the stalks 2, of the cotton plants b, in order that boll weevils being brushed from the foliage of said plants by the brushes 23 and 24, will fall directly upon said inclines and thereby be guided into the said pans 15 or 16.

The sets of brushes 23 and 24 are spaced apart so that the foliage of each plant must pass therebetween. The brushes of each set are arranged in spaced apart vertical alinement and are fixed to rotatable or oscillatory shafts 25 and 26, and their very flexible fibers may be of cotton or bristles and of a nature not to damage the foliage of the plant. The upper ends of said shafts operate through bores in said frame member 27, and are suspended therefrom by means of fixed collars 28 and 29 and to which are fixed pinions 30 and 31, which are meshed with horizontally reciprocating rack gears or bars 32 so arranged as to give the brushes a 60° swing, whereby the leaves of the plant are brushed from both sides, thus divesting the plant of the pests. The rack gears are formed on the rods 71, to be described hereinafter.

The insect receiving pans 15 and 16 are identical in construction. Pan 15, for instance, is provided with an intermediate horizontal wall 34, said wall being provided with a series of aligning openings 36 registering with like openings 37 formed in the bottom of a series of depressions or pockets 38 longitudinally and transversely aligned, these pockets being approximately 5 inches square and having their walls 39 inclining inwardly and downwardly to the said openings 37, whereby insects falling into said pockets will be directed through said openings 37 and 36 into said pan 15.

Seated on the bottom wall 40 of the pan 15, as best shown in Figure 9 are a series of stove bolts 41 or the like, each being of a length to extend vertically through the openings 36 and 37 to form supports for conical hoods or caps 42, which caps are mounted upon all of said bolts. The small diameter of said bolts is such that a space is provided between them and the circumference of the registered holes as to permit the passage of captured insects there-through. Threaded on each of said members 41, above the openings 37, are nuts 43 which form seats for coil expansion springs 44. The upper ends of the bolts extend through the apex of said caps 42 and have threaded on the outer end 45, nuts 46 whereby the caps are held upon the bolts.

Spaced apart, around the lower rim 47 of said caps and attached thereto (Figure 9), is a series of spring wires 48 having their lower ends curved upwardly and inwardly. These wires form stops to prevent the caps coming so close to the inclined walls 39 as to prevent passage of insects into the pan 15. These caps 42 form guards to prevent insects from flying up and thus escaping from the pockets 38. The relative position of the caps 42 to the walls of the pockets 38 may readily be adjusted through tightening or loosening nuts 46.

The ends 49 and 50 of pans 15 and 16 (Figure 3) incline to the pipe outlets 51 and 52 which are connected to suction pipes 53 and 54 (Figure 2) which are connected by flexible sections 55 and 56 permitting swivel movement of pipes 53 and 54 and acting as shock absorbers to prevent the transmitting of shocks incident to rough terrain, to the suction system now to be detailed.

Mounted upon the frame member 27 of my machine is a base 57 for a motor 58 preferably air cooled, for actuating the suction system, the latter including a main transverse pipe 60, with branch pipes 61 and 62, which connect with the said flexible pipes 55 and 56. The pipe 60 connects with another pipe line 63 connected with the blower 59 and disposed longitudinally of the machine leading into the fan casing 64 (Figure 1) which casing has an outlet pipe 65 which has an elbow 66 connected by a bayonet joint controlled collar 67 to the mouth 68 of a suitable receptacle 69.

The pans 15 and 16 are supported by the links 70. The cables or the like 70' are connected to the manually operated rods 71 and to some of the links 70, as seen in Fig. 1. The rods 71 are slidably mounted in brackets 72 whereby the pans may be shaken from end to end to assist in causing the contents of the pans to be carried to the outlet pipes 51 and 52. The aforementioned rack bars 32 are also formed on the rods 71 for the purpose of actuation of the brushes and pans.

In operation the device is moved through a cotton field so that the sets of brushes straddle the cotton plants. When the rods 71 are moved back and forth, the brushes through the described gearing are oscillated to brush boll weevils from the cotton plants. At the same time and as a result of the movement of the rods, the weevil collecting pans are shaken to cause the weevils to fall into the various hooded compartments. Thereafter the weevils are drawn from the pans by the suction of the blower 59 through the suction system.

I claim:

1. An insect exterminating device comprising a frame, insect receiving pans secured to said frame and arranged for swinging movement, means for brushing insects from plants, means oscillatingly mounting said brushing means on said frame and above said pans, means carried by said frame for simultaneously oscillating said brushing means and swinging said insect receiving pans, said pans having pockets, rods secured in said pockets, caps having inclined walls, and means resiliently supporting said caps on said rods.

2. An insect exterminating device comprising a frame, insect receiving pans secured to said frame and arranged for swinging movement, means for brushing insects from plants, means oscillatingly mounting said brushing means on said frame and above said pans, means carried by said frame for simultaneously oscillating said brushing means and swinging said insect receiving pans, said pans having pockets, rods secured in said pockets, caps having inclined walls, means resiliently supporting said caps on said rods, and a suction device communicating with said pans for removing insects from the pans.

3. An insect exterminating device comprising a frame, insect receiving pans secured to said frame and arranged for swinging movement, means for brushing insects from plants, means oscillatingly mounting said brushing means on said frame and above said pans, means carried by said frame for simultaneously oscillating said brushing means and swinging said insect receiving pans, said pans having pockets, rods secured in said pockets, caps having inclined walls, means resiliently supporting said caps on said rods, a suction device communicating with said pans for withdrawing insects therefrom, said oscillatingly mounting means including a shaft rotatively mounted in said frame, a gear secured to said shaft, an operating rod slidably secured to said frame, and a rack bar on said slidable rod enmeshed with said gear.

4. An insect exterminating device comprising a frame, insect receiving pans secured to said frame and arranged for endwise movement, means for brushing insects from plants, means for oscillatingly mounting said brushing means on said frame, means for simultaneously oscillating said brushing means and shaking said insect receiving pans, said pans having pockets, rods secured in said pockets, caps having inclined walls, means resiliently supporting said caps on said rods, a suction device communicating with said pans for withdrawing insects therefrom, said oscillatingly mounting means including a shaft rotatively disposed in said frame, a gear secured to said shaft, a rod slidably secured to said frame, a rack bar on said slidable rod enmeshed with said gear, and said shaking means including a cable secured to said slidable rod and connected with said pans.

5. An insect exterminating device comprising a frame, insect receiving pans secured to said frame and arranged for endwise movement, means disposed above said pans for brushing insects from plants, means for oscillatingly mounting said brushing means on said frame, means for simultaneously oscillating said brushing means and shaking said insect receiving pans, said pans having pockets, a vertical rod secured in each of said pockets, caps having inclined walls, means resiliently supporting said caps on said rods, a suction device communicating with said pans for removing insects therefrom, said oscillatingly mounting means including a shaft journaled in said frame, a gear secured to said shaft, a rod slidably secured to said frame, a rack bar formed on said slidable rod and enmeshed with said gear, said shaking means including a cable secured to said slidable rod and connected with said pans, and said brushing means including a plurality of spaced brushes secured to said shaft.

JOE E. McELREATH.

REFERENCES CITED

The following references are of record in the file of this patent:

UNITED STATES PATENTS

| Number | Name | Date |
| --- | --- | --- |
| 116,894 | Turney | July 11, 1871 |
| 560,932 | Reeder | May 26, 1896 |
| 584,246 | Strouhal | June 8, 1897 |
| 658,663 | Lundy | Sept. 25, 1900 |
| 784,628 | McGovney | Mar. 14, 1905 |
| 1,309,556 | Van Riper | July 8, 1919 |
| 1,400,522 | Cannon | Dec. 20, 1921 |
| 1,458,799 | Brigden | June 12, 1923 |
| 1,499,981 | Hancock | July 1, 1924 |
| 1,504,474 | Holmes | Aug. 12, 1924 |
| 1,521,424 | Brownlee | Dec. 30, 1924 |
| 1,530,046 | Hamby | Mar. 17, 1925 |
| 1,532,215 | Woods | Apr. 7, 1925 |
| 1,575,072 | Manley | Mar. 2, 1926 |
| 1,887,771 | Marsh | Nov. 15, 1932 |
| 2,255,360 | Miller | Sept. 9, 1941 |